(12) United States Patent
Gaffe et al.

(10) Patent No.: US 7,934,378 B2
(45) Date of Patent: May 3, 2011

(54) MASTER CYLINDER COMPRISING A SEAL AND AN ASSOCIATED GROOVE PROMOTING RESUPPLY

(75) Inventors: Francois Gaffe, Bondy (FR); Antony Auguste, Villier sur Marne (FR); Laurent Lhuillier, Le Blanc Mesnil (FR); Olivier Bernadat, La Perreux (FR)

(73) Assignee: Robert Bosch GmbH, Stuttgart (DE)

( * ) Notice: Subject to any disclaimer, the term of this patent is extended or adjusted under 35 U.S.C. 154(b) by 524 days.

(21) Appl. No.: 12/125,352

(22) Filed: May 22, 2008

(65) Prior Publication Data
US 2008/0289330 A1 Nov. 27, 2008

(30) Foreign Application Priority Data
May 22, 2007 (FR) ...................................... 07 03642

(51) Int. Cl.
*B60T 11/236* (2006.01)
(52) U.S. Cl. .......................................................... 60/588
(58) Field of Classification Search .................... 60/562, 60/585, 588
See application file for complete search history.

(56) References Cited

U.S. PATENT DOCUMENTS
| | | | |
|---|---|---|---|
| 6,978,614 B2 | 12/2005 | Bourlon et al. | |
| 7,401,468 B2 * | 7/2008 | Mouri et al. | 60/588 |
| 2004/0128995 A1 | 7/2004 | Bacardit et al. | |

FOREIGN PATENT DOCUMENTS
EP   1479582 A1   11/2004

OTHER PUBLICATIONS
FR0703642 Search Report and Written Opinion.
* cited by examiner

*Primary Examiner* — Thomas E Lazo
(74) *Attorney, Agent, or Firm* — Michael Best & Friedrich LLP

(57) ABSTRACT

Brake master cylinder (10) for a motor vehicle, of the type which comprises a substantially axial body (12) inside a bore (14) of which at least one axial piston is slideably mounted, of the type in which the bore (14) comprises two seals, front (30, 34) and rear, interposed between the piston and the bore (14), the seals (30, 34) comprising three radially concentric lips accommodated in grooves (70, 72) in the bore (14), characterized in that the seals (30, 34) comprise central lips of reduced cross section.

5 Claims, 2 Drawing Sheets

MASTER CYLINDER COMPRISING A SEAL AND AN ASSOCIATED GROOVE PROMOTING RESUPPLY

BACKGROUND AND SUMMARY OF THE INVENTION

The invention relates to a brake master cylinder for a motor vehicle.

The invention relates more specifically to a brake master cylinder for a motor vehicle, of the type which comprises a substantially axial body inside a bore of which is slideably mounted at least one axial piston which is capable of being actuated by a driver of the vehicle between a rear rest position and a forward braking force application position, and which is returned elastically toward its rear rest position, of the type in which the bore comprises two seals, front and rear, which are interposed between the piston and the bore, the front seal delimiting, in the bore, a rear supply chamber and a front pressure chamber, of the type in which the body comprises a radial supply duct which connects an external hydraulic fluid reservoir to the rear supply chamber and which opens out between the two seals, of the type in which the body comprises a braking circuit supply hole which opens into the front pressure chamber, of the type in which the piston comprises a bore, open to the front, communicating on the one hand with the front pressure chamber and on the other hand with the periphery of said piston by way of at least one hole which, when the piston occupies its rear rest position, is arranged between the two seals so as to open communication between the front pressure chamber and the rear supply chamber and which, when the piston is moved axially forward toward its application position, is capable of passing beyond the front seal in order to isolate the front pressure chamber from the rear supply chamber and thus allow a braking pressure to be established in the front pressure chamber, of the type in which at least each front seal is accommodated in a groove in the body of the master cylinder and comprises three concentric lips with an axial orientation, in particular, a first inner lip of which a free end is arranged in contact with the periphery of the piston, a second central lip of which the free end is arranged, in a rest position, in contact with a front face of the groove, and a third outer lip of which a free end is arranged, in a rest position, in contact with a peripheral bottom face of the groove, the second central lip and the third outer lip being capable, when the front pressure chamber is exposed to a partial vacuum caused by the return of the piston from its forward application position to its rest position or else by the activation of a trajectory control device forming part of the braking circuit, of separating from the front face and from the bottom peripheral face of the groove so as to respectively allow the reservoir to be resupplied by means of the front pressure chamber or else the front pressure chamber to be resupplied by the reservoir.

Many examples of brake master cylinders of this type are known.

In most master cylinders of this type, the piston is generally guided in the bore by way of at least two annular bearing surfaces of the bore, these surfaces being respectively arranged in front of the front seal and to the rear of the real seal.

The bearing surface which is arranged in front of the front seal adjoins the groove which accommodates the front seal and it comprises so-called resupply grooves which are intended to allow brake fluid to flow through these resupply grooves when the front pressure chamber is exposed to a partial vacuum caused by the return of the piston from its forward application position to its rest position or else when an "ESP"-type trajectory control device of the braking circuit is activated and generates a partial vacuum in the front pressure chamber.

The groove which accommodates the front seal generally comprises a straight transverse front face joined to a straight transverse rear face by way of a peripheral bottom face. The second central lip and the third outer lip of the front seal have ends which are intended to adhere respectively to the straight transverse front face and to the peripheral bottom face of the groove.

When the front seal is exposed to a partial vacuum, the ends of the second central lip and of the third outer lip of the front seal respectively separate from the straight transverse front face of the groove and from the peripheral bottom face of the groove so as to respectively allow the reservoir to be resupplied by means of the front pressure chamber or else the front pressure chamber to be resupplied by the reservoir.

What has been found in many cases, however, is that the central lip and the third outer lip of the front seal separate only imperfectly from the front face of the groove and from the peripheral bottom face of the groove. In that case, the brake fluid flow rate is insufficient for the resupply process to proceed correctly.

This is particularly evident when the vehicle is equipped with an "ESP"-type trajectory control device, in which the demand for brake fluid, which is intended to supply one or more of the brake calipers of the vehicle, can be high even when the piston is occupying an application position in the pressure chamber. An insufficient flow rate can lead to a lack of efficiency, or at least to a detrimentally slow reaction of the "ESP"-type trajectory control device.

To overcome this disadvantage, the invention provides a brake master cylinder comprising means for increasing the resupply flow rate across the front seal.

To this end, the invention provides a brake master cylinder of the above-described type, characterized in that the groove comprises a chamfer which extends from the bore to at least one intermediate portion of the front face of the groove with which the end of the second central lip is in contact in its rest position, and in that said end of the second central lip has a reduced cross section to facilitate the separation by tilting of the second central lip in order to cause the separation by tilting of the third outer lip, with the aim of facilitating the resupply of the front pressure chamber by the reservoir.

According to other features of the invention: the seal comprises a junction wall joining together the three lips, and said junction wall comprises a notch, arranged level with the second central lip, which is intended to facilitate the separation by tilting of the second central lip and the third outer lip; the second central lip forms a defined angle of inclination with the first inner lip and the third outer lip through which it is inclined toward the first inner lip; the end of the second central lip comprises a beveled outer face directed toward the third outer lip so as to form the reduced cross section of the second central lip; the master cylinder is of the tandem type and it comprises, in its substantially axial body, a bore inside which two axial pistons are slideably mounted, and two front seals which comprise second central lips of reduced cross section and notches, these seals being accommodated in two associated chamfered grooves.

BRIEF DESCRIPTION OF THE DRAWINGS

Other features and advantages of the invention will become apparent on reading the detailed description below which will be understood by referring to the appended drawings, in which.

DETAILED DESCRIPTION

In the description which follows, identical reference numbers denote parts which are identical or have similar functions.

By convention, the terms "front", "forward" and "rear" respectively denote elements or positions respectively oriented toward the left and the right of the figures.

Figure 1:
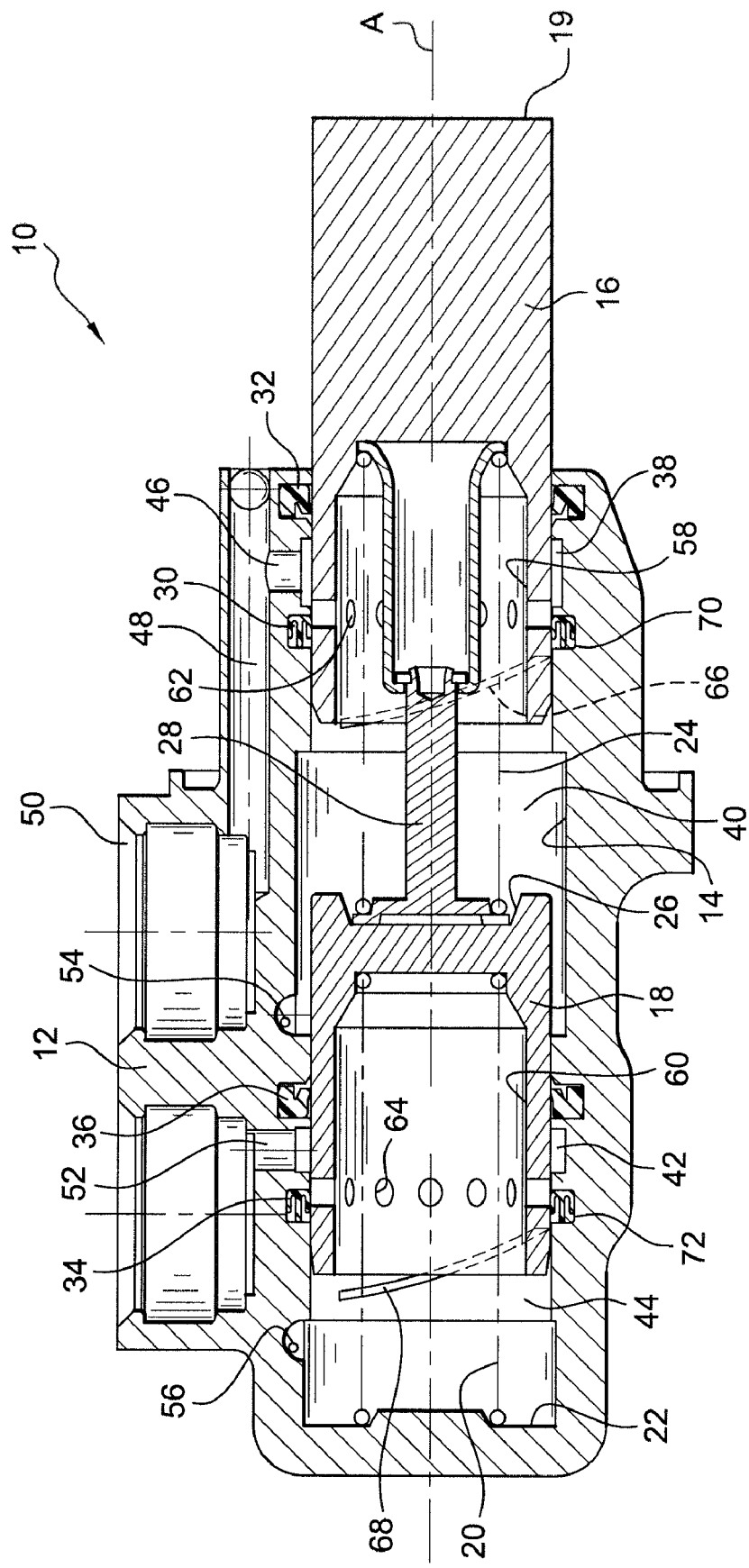
FIG. 1 is a view in axial section of a "tandem"-type master cylinder according to the invention.

FIG. 1 shows the whole assembly of a brake master cylinder 10 for a motor vehicle.

In a known manner, the master cylinder 10 comprises a substantially axial body 12, of axis "A", inside a bore 14 of which at least one axial piston is slideably mounted.

In the preferred embodiment of the invention, the master cylinder 10 is a "tandem"-type master cylinder which comprises a substantially axial body 12, of axis A, inside a bore 14 of which two axial pistons 16 and 18 are slideably mounted.

However, this configuration does not impose any limitation on the invention, and the master cylinder 10 could be a simple master cylinder having only one sliding piston.

The piston 16, termed primary piston 16, is intended to allow a hydraulic pressure to be established in a primary braking circuit (not shown) of the vehicle, and the piston 18, termed secondary piston 18, is intended to allow a hydraulic pressure to be established in a secondary braking circuit (not shown) of the vehicle that is independent of the primary braking circuit of the vehicle.

Each of these two circuits is associated with a trajectory control device which is capable of actuating vehicle braking components, such as brake calipers, independently of the master cylinder.

The primary piston 16 is capable of being actuated directly by a driver of the vehicle. For example, a rear end 19 of the primary piston 16 is capable of being connected to a booster (not shown) which amplifies the forces exerted on a vehicle brake pedal.

The secondary piston 18 is capable of being actuated indirectly by the driver of the vehicle, in particular by the primary piston 16.

Each primary 16 or secondary 18 piston is thus able to move between a rear rest position, which is represented in FIG. 1, and at least one forward braking force application position (not shown).

In a known manner, each primary 16 or secondary 18 piston is returned elastically toward its rear rest position, for example against an end stop (not shown).

In particular, the secondary piston 18 is returned toward the rear by a spring 20 which bears against a transverse front end face 22 of the bore 14 and against the secondary piston 18, and the primary piston 16 is returned elastically toward the rear by a spring 24 which bears against a transverse rear face 16 of the secondary piston 18 and against the primary piston 16. More specifically, since the spring 24 has a long length in particular, it is mounted around a sliding ram 28 which is interposed between the transverse rear face 26 of the secondary piston 18 and the primary piston 16.

The bore 14 comprises two primary seals, front 30 and rear 32, which are respectively interposed between the primary piston 16 and the bore 14, and two secondary seals, front 34 and rear 36, which are respectively interposed between the secondary piston 18 and the bore 14.

Consequently, the front primary seal 30 delimits, in the bore 14, a rear supply chamber 38 and a front pressure chamber 40. Similarly, the front secondary seal 34 delimits, in the bore 14, a rear supply chamber 42 and a front pressure chamber 44.

The body 12 comprises a primary radial supply duct 46 which connects an external primary hydraulic fluid reservoir (not shown) to the primary rear supply chamber 38 and which opens out between the two primary seals 30 and 32.

In particular, the primary radial supply duct 46 is, for example, connected by way of an intermediate longitudinal duct 48 to an orifice 50 which opens to the outside of the body 12 and which is intended to accommodate an outlet (not shown) of the associated primary reservoir.

The body 12 comprises a secondary radial supply duct 52 which connects an external secondary hydraulic fluid reservoir (not shown) to the secondary rear supply chamber 42 and which opens out between the two secondary seals 34 and 36.

The body further comprises two holes, primary 54 and secondary 56, for supplying the associated primary and secondary braking circuits, these holes opening into the associated primary 40 and secondary 44 front pressure chambers.

Among other embodiments known from the prior art, each piston 16, 18 comprises a bore 58, 60, open to the front, communicating on the one hand with the associated front pressure chamber 40, 44 and on the other hand with the periphery of said piston 16, 18 by way of at least one hole 62, 64 whose position with respect to the associated primary or secondary front seal 30, 34 determines the selective opening of communication between the primary and secondary rear supply chambers 38, 42 and the primary and secondary front pressure chambers 40, 44.

Thus, when the piston 16, 18 occupies its rear rest position shown in FIG. 1, the associated hole 62, 64 is arranged between the two primary 30, 32 and secondary 34, 36 seals so as to open communication between the front pressure chamber 40, 44 and the rear supply chamber 38, 42.

When the piston 16, 18 is moved axially forward toward its application position (not shown), the hole 62, 64 passes beyond the front seal 30, 34 so as to isolate the front pressure chamber 40, 44 from the rear supply chamber 38, 42, thereby establishing a braking pressure in each front pressure chamber 40, 44.

Moreover, as illustrated in FIG. 1, each front seal 30, 34 is accommodated in an associated groove 70, 72 in the body 12 of the master cylinder.

Figure 2A:
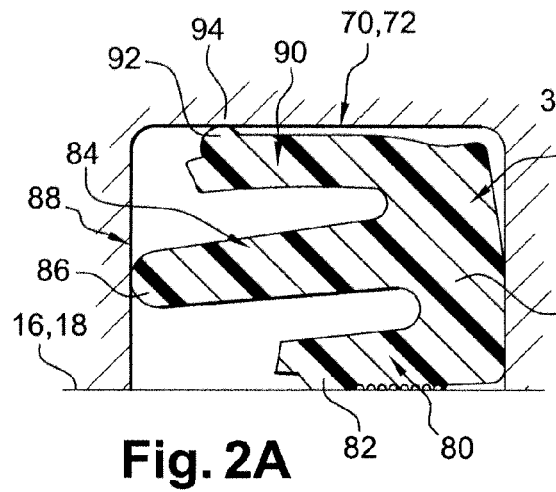
FIG. 2A is a half-view in axial section of a conventional seal fitted in its groove, in a rest position.
Figure 2B:
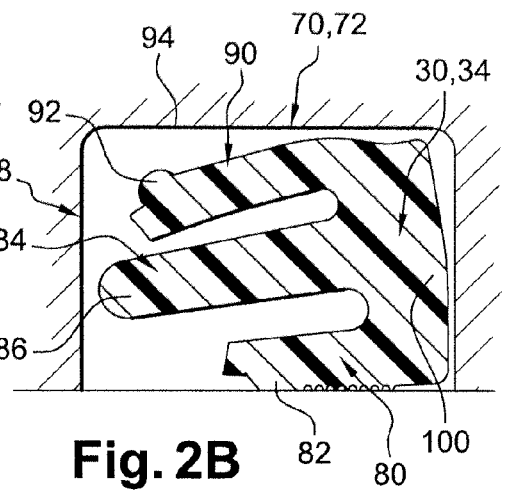
FIG. 2B is a half-view in axial section of a conventional seal fitted in its groove, in a resupply position.

As illustrated in FIG. 2 and the following figures, each front seal 30, 34 comprises three concentric lips with an axial orientation, in particular: a first inner lip 80 of which a free end 82 is intended to be arranged in contact with the periphery of the piston 16, 18, a second central lip 84 of which the free end 86 is arranged, in a rest position, in contact with a front face of the groove 70, 72, and a third outer lip 90 of which a free end 92 is arranged, in a rest position, in contact with a bottom peripheral face 94 of the groove 70, 72.

When the piston 16, 18 returns from its forward application position to its rest position, or when a trajectory control device forming part of the braking circuit and connected to the primary and secondary braking circuits is activated, a partial vacuum is generated in the primary and secondary front pressure chambers 40, 44 that causes the second central lip 84 and the third outer lip 90 to separate from the front face 88 and from the bottom peripheral face 94 of the groove 70, 72 so as to allow the front pressure chamber 40, 44 to be resupplied by the reservoir.

In an analogous manner, the separation of the lips 84, 90 of the seals 30, 34 allows the primary and secondary front pressure chambers 40, 44 to be resupplied by the primary 46 and secondary 52 radial supply ducts, and hence by the associated reservoirs, when a trajectory control device of the braking circuit connected to the primary and secondary braking circuits is activated.

Resupply is, moreover, made possible in front of the seals 30, 34 by a groove 66, 68 which is formed, in the bore, in front of a groove 70, 72 which accommodates the front seal 30, 34.

Conventionally, the front face 88 of the groove 70, 72 is a straight transverse face.

What has been found in many cases, however, is that the second central lip 84 and the third outer lip 90 of the front seals 30, 34 separate only imperfectly from the front face 88 of the groove 70, 72 and from the peripheral bottom face 94 of the groove. In that case, the brake fluid flow rate is insufficient for the resupply process to proceed correctly.

To overcome this disadvantage, the invention provides means intended to facilitate the respective separation of the second central lip 84 and the third outer lip 90 from the front face 88 of the groove 70, 72.

Figure 3A:
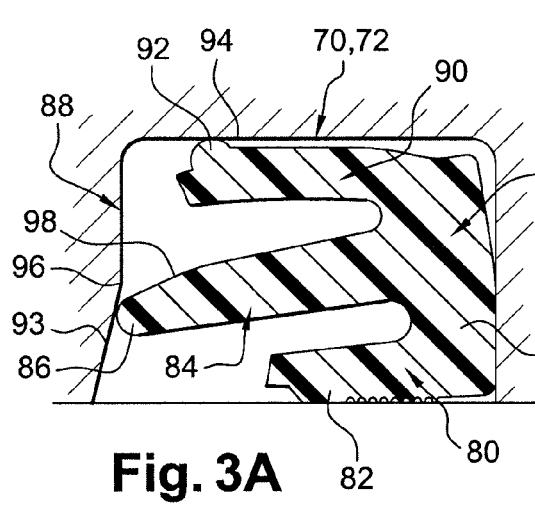
FIG. 3A is a half-view in axial section of a seal embodied according to a first embodiment of the invention and fitted in its groove, in a rest position.
Figure 4A:
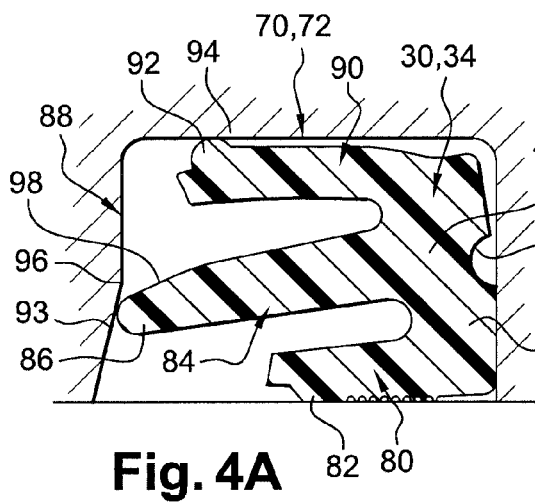
FIG. 4A is a half-view in axial section of a seal embodied according to a second embodiment of the invention and fitted in its groove, in a rest position.

To this end, the invention provides a groove 70, 72 which comprises a chamfer 93 which extends from the bore 14 to at least one intermediate portion 96 of the front face 88 of the groove 70, 72, with which the end 86 of the second central lip 84 is in contact in its rest position, as illustrated in FIGS. 3A and 4A. The invention also provides a specific configuration of the end 86 of the second central lip 84.

Figure 3B:
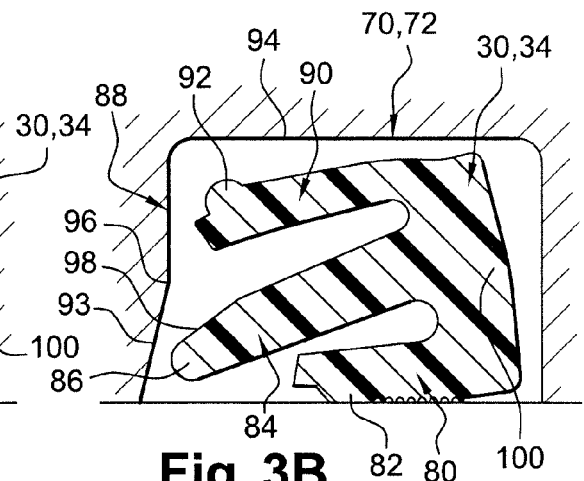
FIG. 3B is a half-view in axial section of a seal embodied according to a first embodiment of the invention and fitted in its groove, in a resupply position.
Figure 4B:
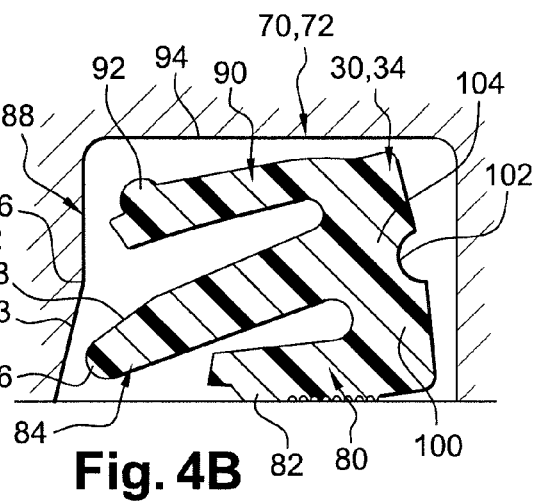
FIG. 4B is a half-view in axial section of a seal embodied according to a second embodiment of the invention and fitted in its groove, in a resupply position.

More specifically, the end 86 of the second central lip 84 has a reduced cross section to facilitate the separation by tilting of the second central lip 84, as represented in FIGS. 3B and 4B, so as also to facilitate the separation by tilting of the third outer lip 90, with the aim of facilitating the resupply of the reservoir by means of the front pressure chamber 40, 44 or else the resupply of the front pressure chamber 40, 44 by the reservoir.

Moreover, in the preferred embodiment of the invention, the second central lip 84 forms a defined angle of inclination with the first inner lip 80 and the third outer lip 90 through which it is inclined toward the first inner lip 80. This configuration is intended to promote the tilting movement of the second central lip 84.

Thus, as illustrated in FIGS. 3A and 4A, with the front seal 30, 34 in the rest position, the end 86 of the second central lip 84 of the seal 30, 34 is arranged substantially in contact with the intermediate portion 96 of the front face 88 of the groove 70, 72, this intermediate portion 96 being arranged in the immediate proximity of the chamfer 93 of the groove 70, 72.

Consequently, when the front seal 30, 34 is exposed to a partial vacuum, the end 86 of the second central lip 84 of the seal 30, 34 instantaneously leaves the front face 88 of the groove 70, 72 and the clearance formed by the chamfer 93 thus offers a wide passage for the hydraulic fluid.

Moreover, the tilting movement of the second central lip 84 of the front seal 30, 34 allows an overall deformation of the seal 30, 34 that causes the separation by tilting of the third outer lip 90 of the front seal 30, 34 and the separation of its end 92 from the bottom face 94 of the groove 70, 72. The clearance formed by the tilting movement of the end 92 of the third outer lip 90 also offers a wide passage for the hydraulic fluid.

In the preferred embodiment of the invention, the end 86 of the second central lip 84 comprises a beveled outer face 98 directed toward the third outer lip 90, this face being intended to form the reduced cross section of the second central lip 84.

It will be understood that this arrangement does not limit the invention and that any means aimed at reducing the cross section of the second central lip 84 may be suitable for the correct implementation of the invention.

By way of example, a first embodiment of the invention comprising a front seal 30, 34 provided with a second central lip 84 whose end 86 comprises a beveled outer face 98 has been represented in FIGS. 3A and 3B.

Advantageously, a second embodiment of the invention, which has been represented in FIGS. 4A and 4B, provides a specific shaping of a junction wall 100 which joins together the three lips 80, 84 and 90 of the front seal 30, 34.

According to the invention, the junction wall 100 in this configuration comprises a notch 102 which is arranged substantially level with the second central lip 84 and which is intended to facilitate the separation by tilting of the second central lip 84 and the third outer lip 90.

Thus, as illustrated in FIG. 4B, when the front seal 30, 34 is exposed to a partial vacuum, the separation by tilting of the second central lip 84 causes the front seal 30, 34 to twist around a base 104 of the second outer lip 84 which is arranged in the immediate vicinity of the notch 102.

This twisting movement produces a deformation in the seal 30, 34 that is accentuated by the presence of the notch 102, forming a region of least resistance of the seal 30, 34, which results in an increased tilting movement of the third outer lip 90 of the front seal 30, 34.

As a result, the hydraulic fluid is successively routed, on the one hand, via the clearance formed between the end 86 of the second central lip 84 and the chamfer 93 and, on the other hand, via the clearance formed between the end 92 of the third outer lip 90 and the peripheral bottom face 94 of the groove 70, 72.

It will be understood that the larger the size of the notch 102, without thereby compromising the strength of the front seal 30, 34, the greater the twisting movement of the seal 30, 34, and hence the better the resupply.

Moreover, it will of course be understood that the shaping of the beveled upper face 98 of the second central lip 86 and the formation of the notch 102 in the junction wall 100 of the front seal 30, 34 can be applied not only in conjunction to produce a front seal 30, 34, but also independently, the front seal 30, 34 then including one or other of these features.

The invention can of course be applied to a tandem-type master cylinder 10 which comprises, in its substantially axial body 12, a bore 14 inside which two axial pistons 16, 18 are slideably mounted, and two front seals 30, 34 which comprise second central lips 84 of reduced cross section and associated notches 102, these seals being accommodated in two grooves 70, 72 comprising chamfers 93.

The invention thus makes it possible to have a master cylinder whereby brake fluid reservoirs and/or associated braking circuits can be resupplied rapidly.

The invention claimed is:

1. Brake master cylinder (10) for a motor vehicle, of the type which comprises a substantially axial body (12) inside a bore (14) of which is slideably mounted at least one axial piston (16, 18) which is capable of being actuated by a driver of the vehicle between a rear rest position and a forward braking force application position, and which is returned elastically toward its rear rest position, of the type in which the bore (14) comprises two seals, front (30, 34) and rear (32, 36), which are interposed between the piston (16, 18) and the bore (14), the front seal (30, 34) delimiting, in the bore (14), a rear supply chamber (38, 42) and a front pressure chamber (40, 44), of the type in which the body (12) comprises a radial supply duct (46, 52) which connects an external hydraulic fluid reservoir to the rear supply chamber (38, 42) and which opens out between the two seals (30, 32, 34, 36), of the type in which the body (12) comprises a braking circuit supply hole (54, 56) which opens into the front pressure chamber (40, 44), of the type in which the piston comprises a bore (58, 60), open to the front, communicating on the one hand with the front pressure chamber (40, 44) and on the other hand with the periphery of said piston (16, 18) by way of at least one hole (62, 64) which, when the piston (16, 18) occupies its rear rest position, is arranged between the two seals (30, 32, 34, 36) so as to open communication between the front pressure chamber (40, 44) and the rear supply chamber (38, 42) and which, when the piston (16, 18) is moved axially forward toward its application position, is capable of passing beyond the front seal (30, 34) in order to isolate the front pressure chamber (40, 44) from the rear supply chamber (38, 42) and thus allow a braking pressure to be established in the front pressure chamber (40, 44), of the type in which at least each front seal (30, 34) is accommodated in a groove in the body of the master cylinder and comprises three concentric lips with an axial orientation, in particular, a first inner lip (80) of which a free end (82) is arranged in contact with the periphery of the piston (16, 18), a second central lip (84) of which the free end (86) is arranged, in a rest position, in contact with a front face (88) of the groove (70, 72), and a third outer lip (90) of which a free end (92) is arranged, in a rest position, in contact with a peripheral bottom face (94) of the groove (70, 72), the second central lip (84) and the third outer lip (90) being capable, when the front pressure chamber (40, 44) is exposed to a partial vacuum caused by the return of the piston (16, 18) from its forward application position to its rest position or else by the activation of a trajectory control device forming part of the braking circuit, of separating from the front face (88) and from the bottom peripheral face (94) of the groove (70, 72) so as to allow the front pressure chamber (40, 44) to be resupplied by the reservoir, characterized in that the groove (70, 72) comprises a chamfer (93) which extends from the bore to at least one intermediate portion (96) of the front face (88) of the groove (70, 72) with which the end (86) of the second central lip (84) is in contact in its rest position, and in that said end (86) of the second central lip (84) has a reduced cross section to facilitate the separation by tilting of the second central lip (84) in order to cause the separation by tilting of the third outer lip (90), with the aim of facilitating the resupply of the reservoir by means of the front pressure chamber (40, 44) or else the resupply of the front pressure chamber (40, 44) by the reservoir.

2. Master cylinder (10) according to claim 1, characterized in that the seal (30, 34) comprises a junction wall (100) joining together the three lips (80, 84, 90), and in that said junction wall (100) comprises a notch (102), arranged level with the second central lip (84), which is intended to facilitate the separation by tilting of the second central lip (84) and the third outer lip (90).

3. Master cylinder (10) according to claim 1, characterized in that the second central lip (84) forms a defined angle of inclination with the first inner lip (80) and the third outer lip (90) through which it is inclined toward the first inner lip (80).

4. Master cylinder (10) according to claim 1, characterized in that the end (86) of the second central lip (84) comprises a beveled outer face (98) directed toward the third outer lip (90) so as to form the reduced cross section of the second central lip (84).

5. Master cylinder (10) according to claim 1, characterized in that it is of the tandem type and comprises, in its substantially axial body (12), a bore (14) inside which two axial pistons (16, 18) are slideably mounted, and two front seals (30, 34) which comprise second central lips (84) of reduced cross section and notches (102), these seals being accommodated in two associated chamfered grooves (70, 72).

* * * * *